M. E. & N. K. KVITLE.
MUSKRAT TRAP.
APPLICATION FILED JAN. 18, 1917.

1,238,026.

Patented Aug. 21, 1917.

Witness
Arthur K. Moore
Wm. H. Mulligan

Inventor
Martin E. Kvitle
Norman K. Kvitle
By Richard Bowen
Attorney

UNITED STATES PATENT OFFICE.

MARTIN E. KVITLE AND NORMAN K. KVITLE, OF CAMBRIDGE, WISCONSIN.

MUSKRAT-TRAP.

1,238,026. Specification of Letters Patent. Patented Aug. 21, 1917.

Application filed January 18, 1917. Serial No. 143,122.

*To all whom it may concern:*

Be it known that we, MARTIN E. KVITLE and NORMAN K. KVITLE, citizens of the United States, residing at Cambridge, in the county of Dane and State of Wisconsin, have invented certain new and useful Improvements in Muskrat-Traps, of which the following is a specification.

This invention relates to a muskrat trap and the primary object of the invention is to provide a trap adapted to be partially submerged in the water inhabited by muskrats and arranged to take advantage of the natural inclination of the muskrats to climb upon an object projecting above the surface of the water.

One of the objects of the invention is to provide a trap of this character having means for permitting the trap to be attached to stationary supporting stakes in a manner that will permit the trap to be raised or lowered for exposing greater or less portions of the trap above the surface of the water.

A further object of the invention is to provide a box-like trap having its top provided with a cover normally held in closed position and adapted to swing downwardly and inwardly when a weight is placed upon the same whereby the animal will be made to fall into the trap when it climbs upon the top of the stake.

A further object of this invention is the provision of a muskrat trap which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of our invention, in which.

Figure 1:
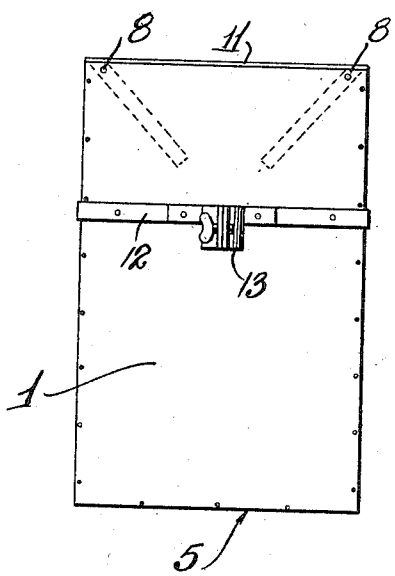
Figure 1 is an end elevation of the trap.
Figure 3:
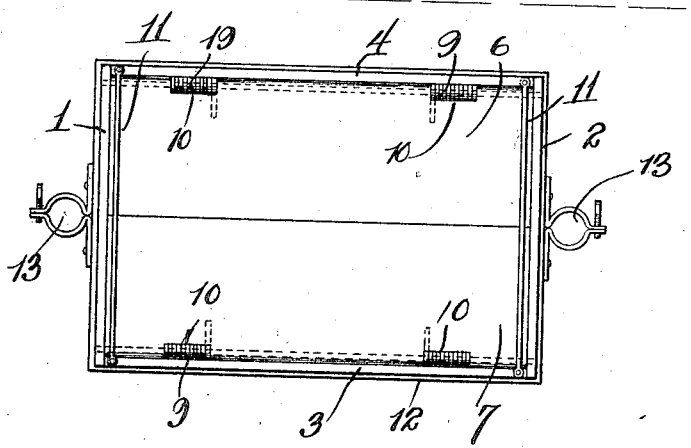
Fig. 3 is a top plan view.

Referring to the drawing, wherein is illustrated the preferred form of our invention, and in which like numerals of reference indicate corresponding parts throughout the several views, the trap is of rectangular box formation including the end walls 1 and 2 and the side walls 3 and 4. The bottom of the trap is closed by the bottom wall 5 and the top or open end of the box-like stake is provided with two pivotally mounted closures 6 and 7. A rod 8 is mounted at the upper end adjacent each side wall of the stake and each closure 6 and 7 is mounted upon one of the rods 8 whereby the closure may swing downwardly as shown by dotted lines in Fig. 1 when the animal is being caught. Ordinary tension springs 9 are mounted upon the rods and disposed in recesses 10 formed in the edges of the closures as shown by Fig. 3 of the drawing. These springs tend to hold the closures in closed position but will permit the closures to open when any weight is placed upon the top of the closures. Two cross rods 11 extend across the top of the open end of the stake for preventing the springs from forcing the closures above a horizontal position.

Figure 2:
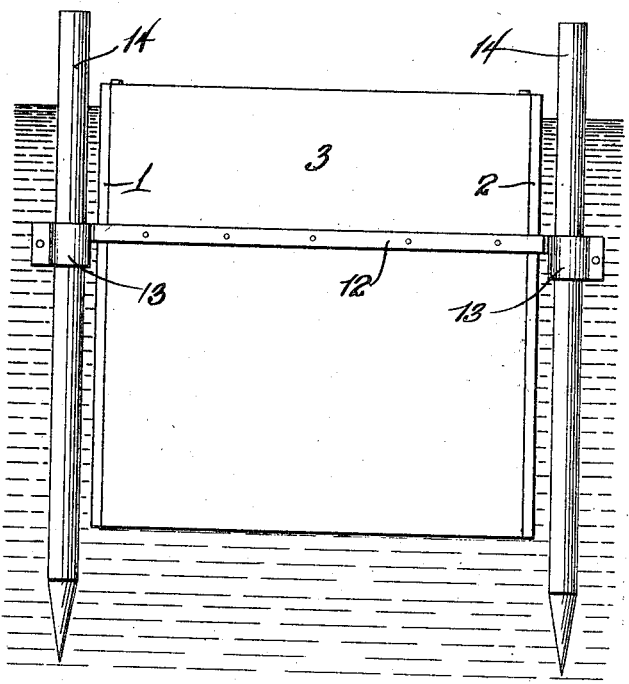
Fig. 2 is a side elevation showing the trap in operative position.

A supporting band 12 extends around the four walls of the stake and this band carries a pair of clamps 13 arranged at each end wall 1 and 2. A suitable stake or post 14 is driven into the earth or bed of the body of water at each end of the trap and the clamps 13 are fastened to the said stakes. By referring to Fig. 2 of the drawing it will be noted that the clamps can be raised or lowered on the stakes for permitting a greater or less portion of the trap to be exposed above the surface of the water. In this connection, it is pointed out, that the traps may be of various sizes and dimensions and when the small size trap is employed it will be necessary to employ only one supporting stake at one end of the trap.

It is well known, especially among trappers, that the natural inclination of a muskrat is to climb upon any object that is exposed above the surface of the water. Therefore, the trap will be mounted upon the stakes so that its top will be partially extended above the water line. The closures 6 and 7 will be held by the springs 9 so that ostensibly a firm foot hold will be exposed. As soon as the animal climbs upon the doors, however, its weight will cause the doors to open downwardly and inwardly thereby precipitating the animal within the box or trap. The closures will immediately be forced by the springs to closed position and the animal will be prevented from escaping from the trap.

From the foregoing it will be observed that a very simple and durable muskrat trap has been provided, the details of which embody the preferred form. We desire it to be understood however, that slight changes in the minor details of construction may be made without departing from the spirit of the invention or the scope of the claims hereunto appended.

We claim:

1. A trap of the character described comprising a receptacle of substantially rectangular configuration, a clamp carried by each end of the receptacle, supporting elements adapted to be embraced by the clamps for permitting vertical adjustment of the receptacle, and spring pressed closures for the open end of the receptacle.

2. A trap of the character described comprising a substantially rectangular receptacle having a supporting band extending around its outer walls and fastened to the receptacle, the portion of the band at each end of the receptacle carrying a clamp member, supporting elements engaged with the clamps, and means for closing the open end of the receptacle and ostensibly for the purpose of providing a firm and rigid closed top for the receptacle.

3. A trap comprising a receptacle having a band formed thereon, the end portions of the band being provided with a clamp, means engageable with the clamps adapted to be submerged in a body of water whereby its top surface may be held substantially at the level of the water, the said top surface including means ostensibly for the purpose of providing a firm foothold.

In testimony whereof we affix our signatures in presence of two witnesses.

MARTIN E. KVITLE.
NORMAN K. KVITLE.

Witnesses:
Oscar Johnson,
Clarence M. Jarkberg.